Dec. 4, 1962 C. P. CHAPMAN 3,067,034

PHOTOGRAPHIC METHOD FOR PRODUCING SILHOUETTE IMAGES

Filed Jan. 22, 1957

INVENTOR

CLIFFORD P. CHAPMAN

BY Strauch, Nolan & Neale

ATTORNEYS

United States Patent Office 3,067,034

Patented Dec. 4, 1962

3,067,034

PHOTOGRAPHIC METHOD FOR PRODUCING SILHOUETTE IMAGES

Clifford P. Chapman, 4512 Sigsbee Road, Silver Spring, Md.

Filed Jan. 22, 1957, Ser. No. 635,531
1 Claim. (Cl. 96—35)

This invention relates to a novel method of making color separation silhouettes for printing of colors or tones in which selected areas of the image are eliminated, the silhouettes being particularly useful in color printing, engraving, and silk screen processes.

In making color plates for the printing or engraving of multi-color images, it is the practice to make a separate negative which silhouettes each area of the image which is of the same color while masking out the remaining colors. Examples of such negatives are illustrated and their use described in United States Patent No. 1,237,-342, issued August 21, 1917.

There are a number of ways of making desired color separation silhouettes such as negatives or positives which are well known in the art. One is for an artist to prepare a separate drawing for each color or tone to be printed and making a negative of each drawing. Another is to mask out all of the colors but one, making up the image, and then make a photographic negative of the one color. This is repeated for each color in the image. All of the methods heretofore used are time consuming and require the careful attention of a skilled person as is illustrated by the methods described.

An object of this invention is to provide a novel and quick method of making a negative or positive having a desired printing area which is produced by making opaque to actinic light clear areas of the negative or positive and then making clear a desired area which is normally opaque on the negative, whereby the desired printing area is produced.

Another object of this invention is to provide a novel photographic silhouette which may be used in silk screen processes.

A further object of this invention is to provide a novel method of quickly making a silhouette having selected areas blanked out, the silhouette being particularly useful in the production of plates for making multi-color images.

Other objects of the invention will, in part, be obvious, and will, in part, appear hereinafter.

For a fuller understanding of the nature and objects of the invention reference should be had to the following detailed description and drawing, in which.

In practicing my invention a process type photographic negative is made from the copy on process film or the like. The copy may be of a non-photographic outline drawing or outline type on a photographic background, a photographic outline drawing, outline type, solid type, or solid areas on a non-photographic background or a film positive or negative of any of the above.

Contact exposures are then made from the above negative on a conventional stripping film. As many pieces of film are exposed as there are to be color printing plates to be used for the final printed reproduction.

The exposed film is then processed by the chemical reversal method as described in "Kodak Formulas for the Graphic Arts," page 11.

After the film has been dried, I etch out and completely remove selected clear sections of the exposed support layer carrying the emulsion. At this point, the stripping film may be used as a stencil in silk screen processes as will be hereinafter described. If the film is to be used in making plates for printing or engraving multi-colored images, the area under the removed support section is then made opaque to actinic light with a suitable colorant. Now, selected areas of the support layer carrying the emulsion are removed to provide a desired clear area or printing area thereunder. After the desired printing areas have been prepared, the film is ready for use in making plates for printing or engraving multi-colored images, as will be understood by those skilled in the art.

Figures 1, 2, 3, 4, 5, 6:
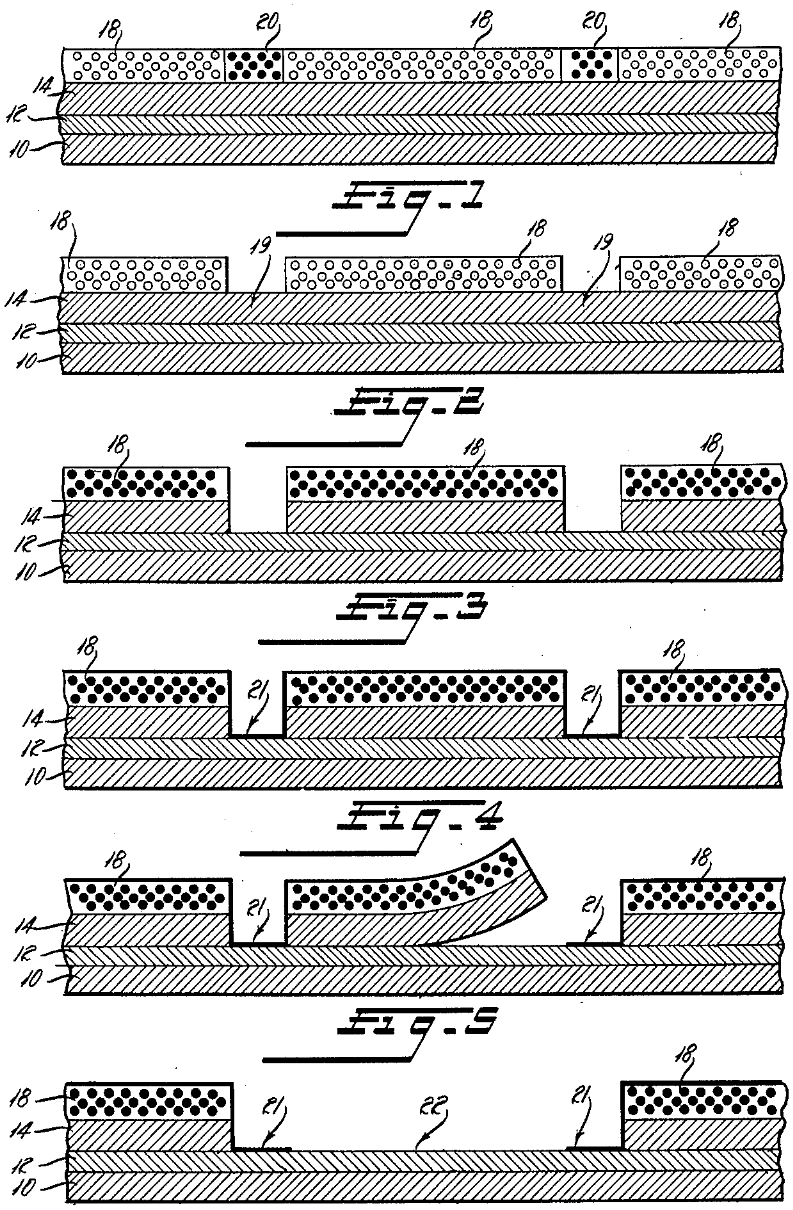
FIGURE 1 is a transverse sectional view of an exposed and developed photographic stripping film having an image thereon.
FIGURE 2 is a transverse sectional view of the stripping film after being chemically reversed with the developed silver-gelatin image being completely etched therefrom.
FIGURE 3 is a transverse sectional view of the redeveloped stripping film with a section of the support layer corresponding to the previously etched image being completely etched out.
FIGURE 4 is a transverse sectional view of the stripping film after a dye which renders the substratum opaque to actinic light has been applied to the surfaces of the film and particularly to the area under the section of support layer etched out.
FIGURE 5 is a transverse sectional view of the stripping film with a portion of the support layer, defined by the etched away sections, being stripped from the base.
FIGURE 6 is a transverse sectional view of the stripping film with the stripping portion removed to provide a clear silhouette or printing area where the stripped portion was formerly positioned.

Referring now to FIGURE 1 of the drawing, and to subsequent figures for the details of my invention, there is illustrated a stripping film comprising a base 10, a substratum layer 12, and a transparent stripping layer 14. The stripping layer 14 is held by an adhesive which softens in water to allow the stripping layer to be removed. Coated on the stripping layer 14 is a conventional photographic emulsion 18 which, as shown, has been exposed and developed to provide a silver image 20 therein. It is to be understood of course that light sensitive emulsions may be used other than those containing silver.

The film used may be any of the conventional stripping films readily available on the market such as "Kodalith Transparent Stripping Film," "Kodaline Ortho Stripping Film" or "Kodalith Pan Stripping Film." "Kodalith Transparent Stripping Film" is supplied on a transparent film base. "Kodaline Ortho Stripping Film" is supplied in rolls on a heavy paper base. "Kodalith Pan Stripping Film" has its emulsion coated on clear film base. The conventional use of such stripping films is illustrated and described in the publication "Kodak Graphic Arts, Film Plates," copyright 1951 by Eastman Kodak Company, pages 20 through 25. It is to be understood of course that any of the conventional stripping films, available on the market of other manufacturers, can be used.

Illustrated in FIGURE 2 of the drawing is the stripping film after having been etched with a chemical reversal etching bath, the silver image area 20 having been completely dissolved or etched away to provide a clear section 19 thereunder. The following etching bath mixed with equal parts of a 3% solution of hydrogen peroxide was used as described in "Kodak Formulas for the Graphic Arts," page 11.

REVERSAL ETCHING BATH

| | Avoirdupois, U.S. liquid ounces | Metric |
|---|---|---|
| Water (125°–150° F.) (50°–65° C.) | 24 | 750 cc. |
| Copper sulfate | 4 | 120.0 grams. |
| Citric acid | 5 | 150.0 grams. |
| Potassium bromide | ¼ | 7.5 grams. |
| Water to make | 32 | 1.0 liter. |

In practicing my invention, the clear section 19 in support layer 14, corresponding to the removed image 20, is completely etched away with a solvent that will not be harmful to the emulsion portion 18, nor the base 10. As shown in FIGURE 3 of the drawing, the emulsion portion 18 has been re-developed and the section 19 of support layer 14 has been completely removed. I have found the following etching solutions to be suitable for etching commercially available stripping films:

*Etching Solution I*

| | Mls. |
|---|---|
| Ethylene glycol monoethyl ether | 15 |
| Isopropyl alcohol (70%) | 20 |

*Etching Solution II*

| | |
|---|---|
| Acetone (N.F.) | 20 |
| Ethylene glycol monoethyl ether | 25 |
| Isopropyl alcohol (70%) | 30 |

*Etching Solution III*

| | |
|---|---|
| Acetone (N.F.) | 15 |
| Isopropyl alcohol (70%) | 20 |

*Etching Solution IV*

| | |
|---|---|
| Ethyl acetate (N.F.) | 6 |
| Isopropyl alcohol (70%) | 14 |

The support layer in commercially available stripping films is generally nitrocellulose. Examples of solvents for nitrocellulose are the ketones such as acetone, isopropanone, propyl ketone, butyl ketone and amyl ketone; esters such as methyl acetate, ethyl acetate, propyl acetate, butyl acetate, amyl acetate; and ethers such as methyl, ethyl, propyl, butyl, amyl, and all the cellosolves. The above list is illustrative of the many solvents available and is not intended to be limiting. For a more extensive list of solvents, reference should be had to "Nitrocellulose: Properties and Uses," copyright 1955 by Hercules Powder Company, Wilmington 99, Delaware, or found in "Modern Plastics Encyclopedia," 1955 edition.

A mixture of two or more solvents may be made so as to adjust the speed of etching. An alcohol such as methyl, ethyl, propyl, butyl and amyl may be added to the etching solution as a buffer. I prefer an etching solution containing ethylene glycol monoethyl ether and isopropyl alcohol because it is not toxic nor does it create a health hazard. Other alcohols, or buffers, may be used; however, isopropyl alcohol has been found to give better results.

The action of the etching solution must be carefully controlled. If the etching action is too fast the solvent undermines the emulsion layer by removing too much of the support layer 14 leaving a fuzzy line resulting in poor resolution. If the etching action is too slow, too much time is consumed in the operation. The etching solutions listed hereinabove will etch away the exposed section of support layer 14 of a stripping film, such as "Kodalith Transparent Stripping Film," in approximately 60 seconds. Etching solutions which will etch away the exposed section of support layer 14 in 40 seconds or less have been found to be too fast. Of course the formulation of the etching solution used may vary with the types of stripping film used and the composition of its support layer. The etching solution may be applied by lightly swabbing the film with a small wad of cotton saturated with solution.

The film as illustrated in FIGURE 3 may be used in silk screen processes. To utilize the film so prepared in such a process, it is wetted with water and placed emulsion side down on a silk screen. The emulsion will adhere to the screen sufficiently for the base 10 and substratum 12 to be readily stripped and thus provide a stencil through the removed section 19 over the silk screen. A colorant such as a dye, ink, or pigment now may be applied to the screen as is well known in the art.

When the stripping film is to be used in processes other than silk screen, a suitable colorant 21 such as a dye, ink or pigment 21 is next applied to the area under the etched out section 19 as shown in FIGURE 4 of the drawing, in the same manner that the etching solution was applied, to render the area opaque to actinic light. As illustrated the colorant is applied over the entire surfaces of the film, that is emulsion 18 and the area under the section 19 of support layer 14 removed.

The following dye solution has given excellent results:

*Dye I*

| | | |
|---|---|---|
| Isopropyl alcohol (70%) | ml. | 35 |
| Tartrazine (yellow) | gr. | 1 |
| Fuchsin (red) | gr. | 0.1 |

A low molecular weight alcohol is a convenient carrier for the above dyes listed such as methyl, ethyl, propyl, and isopropyl. Other dyes may be used such as sudan yellow, Du Pont Oil Red, Du Pont Oil Yellow and National Oil Yellow or combinations thereof, it being understood of course that other solvents are necessary for oil dyes such as acetone, ethyl acetate and the like. The dyes listed herein are illustrative of the many which may be used; however, one must be selected which does not soften or otherwise damage the emulsion layer 18. Also, the dye selected may depend upon the type of base to which it is to be applied. For example, dyes such as tartrazine (yellow) and fuchsin (red) have given excellent results when dyeing the substratum 12 in present commercially available stripping films. The oil dyes have been found to give best results when dyeing the base 10.

When the adhesive holding the support layer to the substratum is water soluble, the adhesive is dissolved by the water in the dye solution whereby the desired portion of support layer 14 may be readily removed.

Equally good results have been achieved by using either an etching solution separately, or an etching solution with a dye added thereto. An etching solution in which the dye is added is so balanced that when the etching of the support layer is complete, the dye begins to make opaque to actinic light the substratum 12 or base 10 if the substratum 12 does not exist in the stripping film used, or was etched away with the removed section 19 of support layer 14.

The following etching solution containing a dye has given excellent results:

*Etching Solution and Dye I*

| | | |
|---|---|---|
| Ethylene glycol monoethyl ether | ml. | 5 |
| Isopropyl alcohol (70%) | ml. | 10 |
| Tartrazine (yellow) | gr. | 1.4 |
| Fuchsin (red) | gr. | .5 |
| Du Pont Oil Yellow | gr. | 1.4 |

Figure 7:
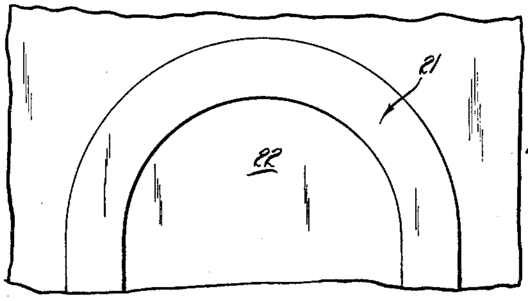
FIGURE 7 is a top plan view of FIGURE 6 defining the clear silhouette area.

Any selected opaque area of the stripping film, comprising support layer 14 and emulsion 18, defined by the etched away section, may be readily removed as shown in FIGURE 5 of the drawing. If desired, all of the support layer 14 and emulsion 18 may be removed, leaving only the opaque area 21. Stripping or removal of any selected area of support layer 14 and emulsion 18 is started by lifting a corner thereof with a stripping knife or sharp pointed instrument. The remainder of support layer 14 and emulsion 18 is then easily removed by peeling. As shown in FIGURE 6 and 7 of the drawing, a clear silhouette or printing area 22 defined by the edges of dyed area 21 is provided over the substratum 12.

As can be readily seen from the foregoing description and drawings, a negative is produced having selected clear silhouette areas or printing areas without requiring a tedious masking of unwanted areas of the image to be reproduced, or the preparation by an artist of selected areas from which a negative can be made.

The term "negative" as used throughout the specification is intended to also include a positive as will be readily understood by those skilled in the art.

The term "printed" as used throughout the specification and claim is intended to include an image made by use of either a stencil, or a printing or engraving plate.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A photographic method for producing silhouette images in a stripping film element which comprises in superposed relationship a translucent flexible base layer, a translucent substratum layer, an intermediate stripping layer removably bonded to a said substratum layer and a photographic emulsion layer overlying said intermediate stripping layer, said method comprising the steps of exposing said photographic emulsion layer to an original containing a continuous outline image to be reproduced, developing said emulsion to produce an opaque image in which said continuous outline image is opaque, removing completely said opaque outline image by chemically etching with an etching solution having a substantially greater solvent potential for the opaque image than for the nondeveloped areas thereby forming a relief image having raised portions and etched portions, the latter corresponding to the outline image in said original, developing the originally non-exposed areas to render them opaque thereby producing opaque areas both within and outside of said continuous outline image, chemically etching to remove those portions of the intermediate layer which underlie the etched areas of the emulsion layer, applying to the etched areas a colorant which is opaque to actinic light and removing by stripping those portions of the emulsion and intermediate layers which lie within said continuous outline image, thereby producing a silhouette image.

References Cited in the file of this patent

UNITED STATES PATENTS

| | | |
|---|---|---|
| 992,898 | Payne | May 23, 1911 |
| 1,430,347 | Albert | Sept. 26, 1922 |
| 1,679,942 | Newton | Aug. 7, 1928 |
| 2,061,230 | Frankenburger et al. | Nov. 17, 1936 |
| 2,073,313 | Murray | Mar. 9, 1937 |
| 2,158,194 | Murray | May 16, 1939 |
| 2,182,814 | Marasco | Dec. 12, 1939 |
| 2,215,128 | Muelendyke | Sept. 17, 1940 |
| 2,371,773 | Neumann | Mar. 20, 1945 |
| 2,446,915 | Filmer | Aug. 10, 1948 |
| 2,459,129 | Gresham et al | Jan. 11, 1949 |
| 2,494,053 | Mitson et al. | Jan. 10, 1950 |
| 2,500,052 | Yackel | Mar. 7, 1950 |
| 2,666,008 | Enslein et al. | Jan. 12, 1954 |
| 2,694,634 | Debenham | Nov. 16, 1954 |
| 2,943,936 | Speckler | July 5, 1960 |

FOREIGN PATENTS

| | | |
|---|---|---|
| 535,436 | Canada | Jan. 8, 1957 |